Sept. 1, 1953     K. R. MONTGOMERY     2,650,506
BELT ADJUSTER
Filed June 21, 1950

Inventor
Kenneth Ray Montgomery
By
Oliver D. Olson
His Agent

Patented Sept. 1, 1953

2,650,506

UNITED STATES PATENT OFFICE 2,650,506

BELT ADJUSTER

Kenneth Ray Montgomery, Coos Bay, Oreg.

Application June 21, 1950, Serial No. 169,373

2 Claims. (Cl. 74—242.15)

This invention pertains to belt adjusters, and relates particularly to a novel device for facilitating the change of position of drive belts upon their drive pulleys.

It is a principal object of the present invention to provide an adjustable device intermediate a driving pulley and a driven pulley whereby to facilitate the adjustment of belts interconnecting said pulleys.

Another important object of this invention is the provision of a device for adjusting the position of belts connecting a driving pulley and a driven pulley, said device being constructed in such manner as to permit said adjustment without obstructing the area separating said pulleys.

A further object is the provision of a belt adjusting device which is manipulated by a single lever and is secured in any desired position by a single locking bolt.

A still further object is the provision of a belt adjusting device of simplified and therefore economical construction and which is readily adapted for use with diverse types of equipment.

These and other objects and advantages of the present invention will appear from the following detailed description taken in connection with the accompanying drawing, in which.

Figure 1:
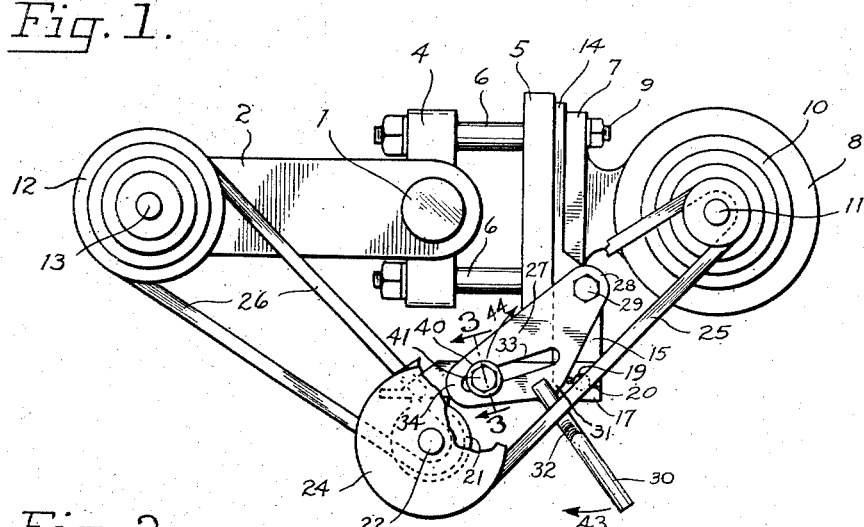
Figure 1 is a plan view showing a belt adjusting device embodying the features of this invention as applied to a conventional drill press, parts thereof being broken away to disclose details of construction.

Stated broadly, the present invention comprises the arrangement of an idler pulley mounted pivotally intermediate a driving pulley and a driven pulley in such manner that manipulation of a lever between fixed limits affords, respectively, loosening and tightening of belts interconnecting said pulleys.

Referring to the drawing, the belt adjusting device embodying the features of this invention is shown applied to a conventional drill press. The basic parts of the drill press are shown to include the supporting standard 1 upon which are mounted for vertical and horizontal adjustment the projecting frame 2 for the head 3 and the main frame 4. The main frame supports a secondary frame 5 adjustable by means of arms 6. The base 7 of drive motor 8 is secured to the secondary frame by means of bolts 9. A pulley 10 is mounted upon the drive shaft 11 of motor 8, said pulley being referred to hereinafter as the driving pulley. A driven pulley 12 is secured to shaft 13 which is mounted for rotation in head 3 for purposes of driving the drill press chuck (not shown). Ordinarily, a single belt extends between the driving pulley 10 and the driven pulley 12. Since said pulleys are disposed in fixed relation with each other, it is necessary when using a single belt drive to stretch the latter sufficiently to change from one speed ratio to another.

The device of the present invention includes a supporting plate 14 which is interposed between the support 5 and the base 7 of motor 8 and secured by the said bolts 9. A pair of brackets 15, 16 are secured to the plate 14 and extend outwardly therefrom adjacent the upper and lower edges, respectively, of one side of said plate. A second pair of brackets 17, 18 are pivotally secured to brackets 15, 16, respectively, by means of pivot pin 19 which is secured detachably in position by cotter pins 20.

Brackets 17, 18 support at their ends opposite pin 19 a bearing housing 21. The bearing housing in turn supports a stepped shaft 22 secured for rotation therein by lock nuts 23. Shaft 22 is arranged to rotate about an axis parallel to the axes of shafts 11 and 13. An idler pulley 24 is mounted upon shaft 22. Belt 25 connects the idler pulley 24 with the driving pulley 10, while belt 26 connects the idler pulley with the driven pulley 12.

Figure 2:
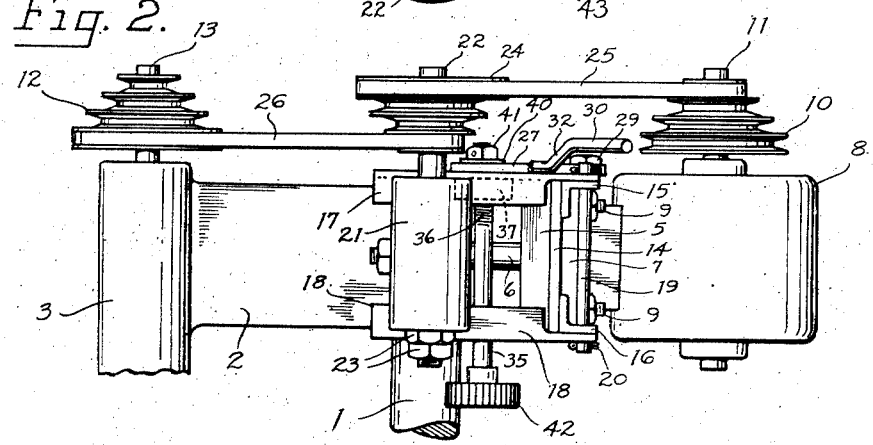
Figure 2 is a fragmentary side elevation of the device shown in Figure 1.

An elongated actuating arm 27 of substantially triangular shape is secured pivotally at one corner 28 to bracket 15 by pivot bolt 29. Said pivot bolt is positioned in spaced relation to pivot pin 19 at the opposite, or inner, end of bracket 15, as clearly shown in Figure 1. A handle 30 is secured to arm 27 adjacent the corner 31 intermediate the ends of said arm. Referring particularly to Figure 1 of the drawing, the handle is offset at 32 for purposes of clearing the belt 25 when the latter is disposed in the lowermost grooves of pulleys 10 and 24. The handle is offset in the drawing in order to expose various other parts of the device to view in Figure 2, it being understood that said handle need not be offset but may extend from arm 27 as a straight member.

Figure 3:
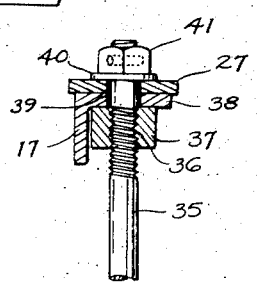
Figure 3 is a fragmentary sectional view of the locking mechanism taken along the line 3—3 in Figure 1.

A slot 33 is provided in arm 27, said slot preferably extending obliquely between the corners 34 and 31. A locking bolt 35 projects through the brackets 17, 18 and through slot 33 for axial rotation therein. The bolt is provided with threads 36 adjacent the end extending through bracket 17 and slot 33 for cooperative engagement with threads formed in the locking block 37 which is positioned immediately below the upper flange 38 of bracket 17, as best shown in Figure 3. The section of bolt 35 extending through the hole 39 in flange 38 and the slot 33 in arm 27 is preferably unthreaded. The extreme end of bolt 35 adjacent arm 27 is provided with a washer 40 and an overlying nut 41. The lower end of bolt 35 is provided with a knurled knob 42 to facilitate manipulation of the former.

The operation of the device is as follows: Referring particularly to Figure 1, the idler pulley 24 is secured in the position in which both drive belts 25 and 26 are tighened. Thus, when drive motor 8 is energized, rotation of pulleys 8, 24 and 12 is effected to operate the drill chuck (not shown). When it is desired to change the speed of operation, the motor is first deenergized. The operator then grasps the knurled knob 42 and rotates it in the direction necessary to move bolt 35 and its attached nut 41 upwardly. This rotation causes the bolt to travel upwardly through the locking block 37 which is restricted from turning by its abutment with bracket 17. As the nut 41 moves upwardly away from block 37, the upper flange 38 of bracket 17 and arm 27 are free to slide relative to each other.

The operator now grasps handle 30 and moves it in the direction of arrow 43 in Figure 1. Arm 27 thereupon rotates in a clockwise direction about pivot bolt 29. As arm 27 begins this rotation, bolt 35 is caused to move with it because the latter projects through slot 33 formed in said arm. Since bolt 35 is mounted in the brackets 17, 18, the latter are caused to rotate in a clockwise direction about pivot pin 19. Bolt 35 thus moves in an arc indicated by arrow 44 with pin 19 as its center. Since arm 27, and hence slot 33, rotate in an arc different from bolt 35, the latter is caused to slide along the said slot as the idler pulley 24 is drawn toward the line extending between pulleys 8 and 12. This movement of pulley 24 decreases the distance between it and the pulleys 8 and 12, whereby the drive belts 25 and 26, respectively, are loosened sufficiently to permit shifting to another position with speed and facility.

After the belts have been positioned as desired, the operator moves handle 30 in a counterclockwise direction, as viewed in Figure 1, to return the idler pulley 24 to the position shown in said Figure 1. The knurled knob 42 is then rotated in the direction required to draw the locking bolt 35 downwardly. By this action the nut 41 and its underlying washer 40 move toward the locking block 37, whereupon the upper flange 38 of bracket 17 and the actuating arm 27 are held frictionally therebetween.

It will be apparent to those skilled in the art that many of the specific details of construction illustrated in the drawing and described hereinbefore may be changed without departing from the scope and spirit of the present invention. For example, motor 8 and its drive shaft 11 may be mounted upon the brackets 17, 18 in such position that said drive shaft 11 replaces the idler shaft 22. In this manner, the third pulley and belt 25 are eliminated and the driving shaft is mounted pivotally to permit ready adjustment of belt 26. In another modification, both of the shafts 11 and 13 may constitute driven shafts and shaft 22 may form the drive shaft of a drive motor. It is to be understood, therefore, that the foregoing description is merely illustrative and that the scope of the invention is not limited except as set forth in the appended claims.

Having now described my invention and the manner in which the same may be used, what I claim as new and desire to secure by Letters Patent is:

1. In combination with a pair of spaced shafts and pulley means on the said shafts; a coupling device comprising a support, bracket means mounted pivotally on the support, a third shaft mounted on the bracket means for axial rotation, pulley means on the third shaft, belt means interconnecting the pair of shafts with the third shaft, an actuating arm mounted pivotally on the support a spaced distance from the pivot support of the bracket means, the pivoted bracket means being positioned to support the pulley means of the third shaft intermediate the pulley means of the pair of shafts whereby to move the pulley means of the third shaft toward both pulley means of the pair of shafts simultaneously to loosen the belt means and away from both pulley means of the pair of shafts simultaneously to tighten the belt means, and locking means releasably interconnecting the bracket means and actuating arm for releasably securing the latter together.

2. In combination with a pair of spaced shafts and pulley means on the said shafts; a coupling device comprising a support, bracket means mounted pivotally on the support, a third shaft mounted on the bracket means for axial rotation, pulley means on the third shaft, belt means interconnecting the pair of shafts with the third shaft, an actuating arm mounted pivotally on the support a spaced distance from the pivot support of the bracket means, the pivoted bracket means being positioned to support the pulley means of the third shaft intermediate the pulley means of the pair of shafts whereby to move the pulley means of the third shaft toward both pulley means of the pair of shafts simultaneously to loosen the belt means and away from both pulley means of the pair of shafts simultaneously to tighten the belt means, one of the bracket means and actuating arm having an elongated slot therein, a threaded bolt extending rotatably through the slot and the other of the bracket means and actuating arm, and clamp means on the threaded bolt on the opposite sides of the bracket means and actuating arm and actuated by the bolt to releasably secure the bracket means and actuating arm together.

KENNETH RAY MONTGOMERY.

References Cited in the file of this patent

UNITED STATES PATENTS

| Number | Name | Date |
|---|---|---|
| 1,019,639 | Hendrickson | Mar. 5, 1912 |
| 1,119,151 | Halbleib | Dec. 1, 1914 |
| 1,173,189 | Hey | Feb. 29, 1916 |
| 2,073,704 | Mitchell | Mar. 16, 1937 |
| 2,075,297 | O'Brien | Mar. 30, 1937 |